United States Patent
Bartek et al.

(10) Patent No.: US 10,528,879 B2
(45) Date of Patent: Jan. 7, 2020

(54) AUTONOMIC GROUP DECISION MAKING USING IMPEDANCE SCORES

(71) Applicant: INTERNATIONAL BUSINESS MACHINES CORPORATION, Armonk, NY (US)

(72) Inventors: Velda Bartek, Apex, NC (US); Eric Leonard Masselle, Raleigh, NC (US); Patrick Gabriel McGowan, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1575 days.

(21) Appl. No.: 14/258,449

(22) Filed: Apr. 22, 2014

(65) Prior Publication Data

US 2015/0302308 A1   Oct. 22, 2015
US 2017/0154272 A9   Jun. 1, 2017

(51) Int. Cl.
*G06N 5/04* (2006.01)
*G06Q 10/06* (2012.01)
*G06Q 10/10* (2012.01)
*H04L 29/08* (2006.01)

(52) U.S. Cl.
CPC .............. *G06N 5/045* (2013.01); *G06Q 10/06* (2013.01); *G06Q 10/101* (2013.01); *H04L 67/10* (2013.01); *G06Q 10/109* (2013.01)

(58) Field of Classification Search
CPC ...... G06N 5/045; G06Q 10/06; G06Q 10/101; G06Q 10/109; H04L 67/10
See application file for complete search history.

(56) References Cited

U.S. PATENT DOCUMENTS

| | | | |
|---|---|---|---|
| 5,400,248 A | * | 3/1995 | Chisholm .............. G07C 13/00 235/386 |
| 7,172,118 B2 | | 2/2007 | Urken |
| 7,752,066 B2 | | 7/2010 | Doss et al. |
| 2005/0067493 A1 | | 3/2005 | Urken |

(Continued)

OTHER PUBLICATIONS

International Business Machines Corporation, "List of IBM Patents or Patent Applications Treated As Related," submitted Apr. 14, 2015, 2 Pages.

(Continued)

*Primary Examiner* — Eric Nilsson
(74) *Attorney, Agent, or Firm* — L. Jeffrey Kelly

(57) ABSTRACT

A method for autonomic group decision making may include presenting a plurality of decision options and receiving at least one decision option selected by each decision maker. A decision result may be presented including an indication of the preference for each option. Each decision maker may be allowed to revise the previously selected option for convergence to a single decision option for the group. An impedance score is determined for each decision maker in response to a decision maker selecting a different decision option. The impedance score may be based on one or more actions by the decision maker regarding selecting the decision option. A level of the impedance score indicates either progress toward or away from convergence. The impedance score may be revised each time a revised option is selected. The single decision option may be presented in response to the decision makers converging on the single decision option.

11 Claims, 5 Drawing Sheets

(56) References Cited

U.S. PATENT DOCUMENTS

| | | |
|---|---|---|
| 2005/0125737 A1 | 6/2005 | Allen et al. |
| 2005/0261953 A1* | 11/2005 | Malek .................. G06Q 30/02 |
| | | 705/7.32 |
| 2007/0023515 A1 | 2/2007 | Urken |
| 2009/0018878 A1 | 1/2009 | Baron et al. |
| 2009/0248474 A1 | 10/2009 | Fried et al. |
| 2013/0211927 A1* | 8/2013 | Kellogg .................. G06N 7/00 |
| | | 705/14.73 |

OTHER PUBLICATIONS

Zeshui Xu, An Automatic Approach to Reaching Consensus in Multiple Attribute Group Decision Making, Computers and Industrial Engineering, May 2009, p. 1369-1374, v 56, n 4, Elsevier Ltd, Shanghai, China.

* cited by examiner

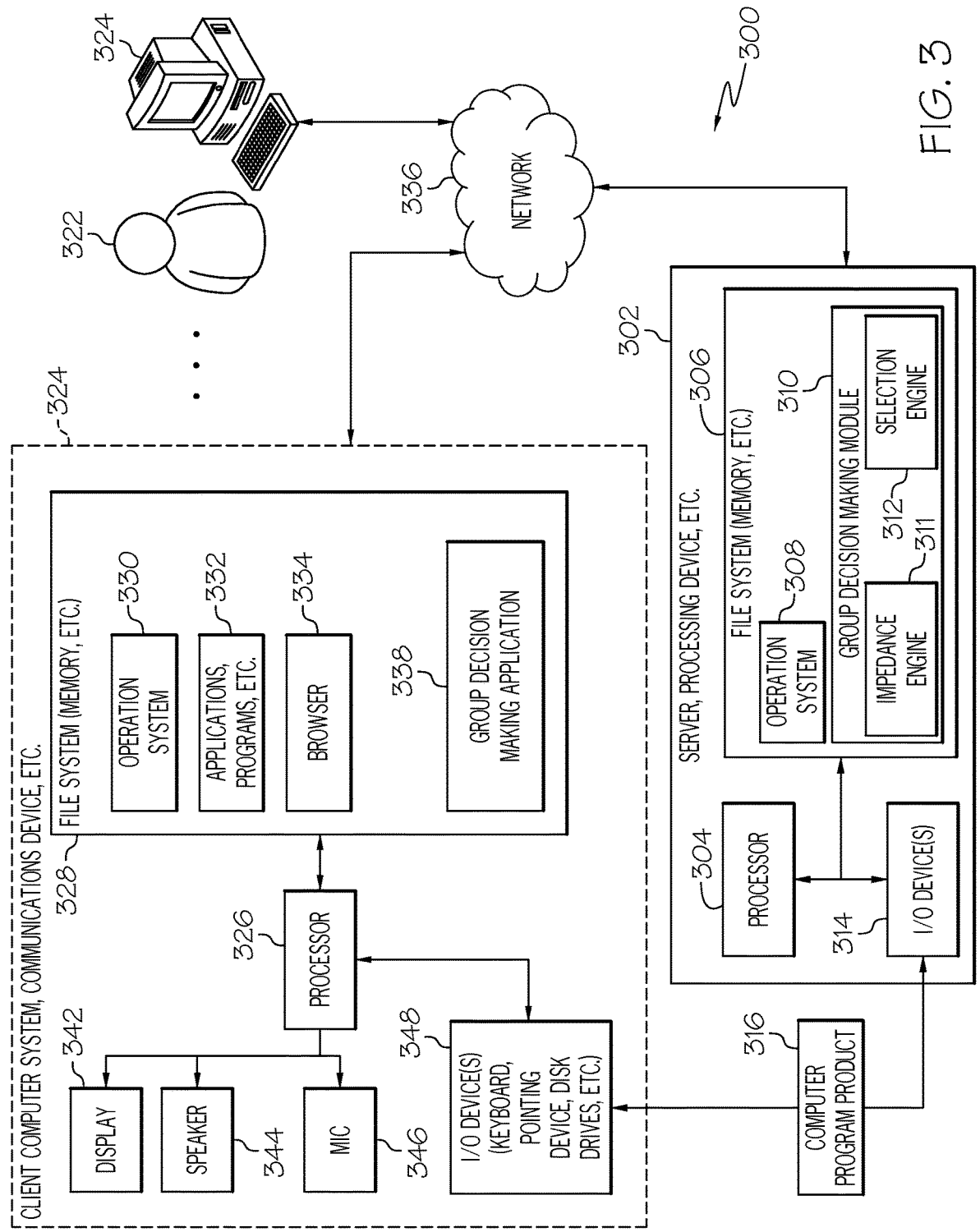

AUTONOMIC GROUP DECISION MAKING USING IMPEDANCE SCORES

BACKGROUND

Aspects of the present invention relate to decision making, and more particularly to a method, system and computer program product for autonomic group decision making using impedance scores.

Reaching convergence in a decision making process between two people or many people can be a difficult and challenging task. Reaching convergence or a consensus may be exacerbated when the decision making process involves multiple sets of decision options and the participants in the decision making process may have competing interests, wants or needs. Decision making processes may typically follow one of two methods, an originator's preference model or a polling/voting model. The originator's preference model may be driven by a preference put forth by an individual originating the decision making process. For example, a meeting time may be proposed by the person who wants to schedule the meeting and the other meeting participants or invitees may either accept or reject the proposed time or times. If rejected, the "solution" (calendar entry) may be modified (moved/rescheduled), resulting in the same fundamental behavior, i.e., a new solution or meeting time is proposed and the other participants either accept or reject the new time. The process may continue in this inefficient manner until a consensus or solution is reached. In the polling/voting model a person, typically the originator, may submit a number of proposals for other participants to vote on the different proposals. Such processes are inefficient and do not provide any social, behavioral or group dynamics information for facilitating the group decision making process.

BRIEF SUMMARY

According to one aspect of the present invention, a method for autonomic group decision making may include presenting, by a computer system, a plurality of decision options to each decision maker of a group of decision makers and receiving, by the computer system, at least one decision option selected by each decision maker from the plurality of decision options. The method may additionally include presenting, by the computer system, a decision making result to each decision maker. The decision making result may include an indication of the preference for each of the decision options by the group of decision makers. The method may further include allowing, by the computer system, each decision maker to revise the at least one decision option previously selected by the decision maker for convergence to the single decision option by the group of decision makers. The method may also include determining an impedance score for each decision maker in response to at least one decision maker selecting a different at least one decision option from one previously selected. The impedance score of each decision maker may be based on at least one action of a set of actions by the decision maker regarding selecting the at least one decision option. A level of the impedance score indicates either a progression toward convergence to the single decision option or away from convergence to the single decision option by the decision maker associated with the impedance score. The method may further include revising the impedance score for a particular decision maker each time the particular decision maker selects a revised at least one decision option. The single decision option may be presented in response to the decision makers converging on the single decision option.

According to another aspect of the present invention, a system for autonomic group decision making may include a processor and a group decision making module operating on the processor. The group decision making module may be configured to perform a set of functions that may include presenting a plurality of decision options to each decision maker of a group of decision makers; receiving at least one decision option selected by each decision maker from the plurality of decision options; presenting a decision making result to each decision maker, the decision making result comprising an indication of the preference for each of the decision options by the group of decision makers; allowing each decision maker to revise the at least one decision option previously selected by the decision maker for convergence to the single decision option by the group of decision makers; determining an impedance score for each decision maker in response to at least one decision maker selecting a different at least one decision option from one previously selected, the impedance score of each decision maker being based on at least one action of a set of actions by the decision maker regarding selecting the at least one decision option, wherein a level of the impedance score indicates either a progression toward convergence to the single decision option or away from convergence to the single decision option by the decision maker associated with the impedance score; revising the impedance score for a particular decision maker each time the particular decision maker selects a revised at least one decision option; and presenting the single decision option in response to the decision makers converging on the single decision option.

According to another aspect of the present invention, a computer program product for autonomic group decision making may include a computer readable storage medium having program instructions embodied therewith. The program instructions are executable by a device to cause the device to perform a method that may include presenting a plurality of decision options to each decision maker of a group of decision makers; receiving at least one decision option selected by each decision maker from the plurality of decision options; presenting a decision making result to each decision maker, the decision making result comprising an indication of the preference for each of the decision options by the group of decision makers; allowing each decision maker to revise the at least one decision option previously selected by the decision maker for convergence to the single decision option by the group of decision makers; determining an impedance score for each decision maker in response to at least one decision maker selecting a different at least one decision option from one previously selected, the impedance score of each decision maker being based on at least one action of a set of actions by the decision maker regarding selecting the at least one decision option, wherein a level of the impedance score indicates either a progression toward convergence to the single decision option or away from convergence to the single decision option by the decision maker associated with the impedance score; revising the impedance score for a particular decision maker each time the particular decision maker selects a revised at least one decision option; and presenting the single decision option in response to the decision makers converging on the single decision option.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3 is a block schematic diagram of an example of a system for autonomic group decision making in accordance with an embodiment of the present invention.

DETAILED DESCRIPTION

Figure 1A:
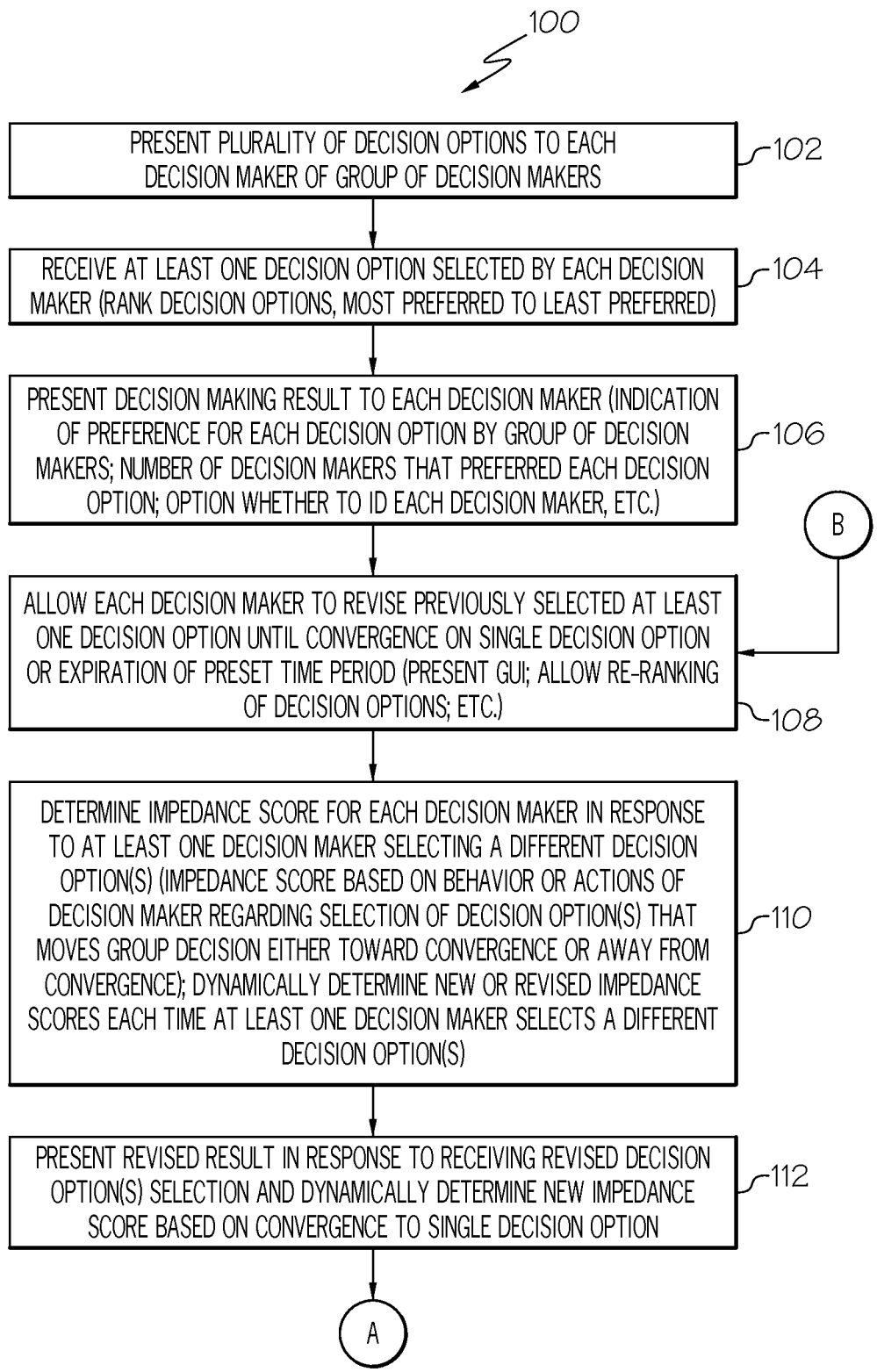
FIGS. 1A-1C (collectively FIG. 1) are a flow chart of an example of a method for autonomic group decision making in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

During a group decision making event or process, a group of decision makers typically desire or need to converge to a single decision option chosen from a set of options. An impedance score may be associated with each participant or decision maker in the group decision-making event. The impedance score of each participant may be based upon the behavior of the participant during the decision making process. A participant with a higher impedance score compared to others may indicate a greater resistance by the participant to convergence to the single decision option, whereas a participant with a lower impedance score may indicate behaviors by the participant that are conducive to convergence to the single decision option. Behaviors conducive to convergence may include, but are not necessarily limited to actions such as specifying a larger number of preferred options, foregoing the option to rank preferred selections, quicker modification of preferred selections to accommodate the choices of others or earlier acceptance or selection during the decision making process of the decision option preferred by most other participants or decision makers, and any other actions that may reduce the time for convergence to the single decision option by all or at least most participants.

Each participant's impedance score may be dynamically calculated while they are participating in the decision making event. Participants may see their current impedance score and be advised of the degree to which their selection or selections may be weighted if a selection engine were to make the final determination of the group's selection, at that moment. The system may also provide insight into the effect that a considered action might have, if the action were to be taken at that moment. However, the decision making process may be extremely dynamic and the outcomes may change in response to a decision making participant selecting a new decision option to move toward convergence of the single decision option. Accordingly, participants or decision makers are prompted to weigh and balance actions motivated by personal interests against actions taken to aid the group in achieving convergence.

If the group of decision makers cannot converge upon the single selection or decision option, a selection engine may calculate or determine a final selection or single decision option using the preferences of the decision makers and the impedance scores of those decision makers or participants. The impedance scores may be utilized to weight the preferences of participants with lower impedance scores more highly. For example, the preferences or preferred decision options selected by participants having lower impedance scores compared to others may be scored or valued higher by the selection engine. In accordance with an embodiment, a preset time period may be specified within which the group of decision makers need to reach convergence before selecting the single decision option may be turned over to the selection engine.

There are multiple ways in which the calculations performed by the selection engine can be performed to select the single decision option. In accordance with at least one embodiment, each participant or decision maker may be ranked from a lowest impedance score to a highest impedance score and a range of impedance scores may be calculated or determined ($I_{range}$). A minimum impedance score ($I_{min}$) may be subtracted from the impedance score for a particular participant or decision maker ($I_{Pn}$) and divided by the range of impedance scores ($I_{range}$). This result may be subtracted from 1 to provide a weighting for the particular decision maker or participant based on the decision maker's impedance score. This resulting values or weighting will be between 0 and 1. A value or weighting of 1 may be assigned to the decision maker or decision makers having the lowest impedance score. Accordingly, weighting for other decision makers may fall between 0 and 1 depending upon the impedance score of the particular decision maker. The equation for determining the weighting of each decision maker may be expressed as:

$$W_{Pn} = 1 - (I_{Pn} - I_{min}/I_{range})$$

Where Pn is Participant n. $I_{Pn}$ is the impedance score of Participant n, and $W_{Pn}$ is the weighting for Participant n based on Participant n's impedance score.

The resulting values provide insight into the 'weighting' that may be applied to the decision option or options selected by each participant or decision maker. Presenting the weighting or value associated with the decision maker to at least the decision maker allows the decision maker in real-time to understand how well or poorly they have balanced their own desires or interest with the need to allow the group to come to convergence on the single decision option. The weighting may be presented to the decision maker before the selection is submitted so that the decision maker may be aware of the impact his potential selection may have on the group decision making process toward convergence.

As an example of how the selection engine may operate, a group of decision makers may be presented a plurality of decision options from which to select. Each decision maker might be directed to select a top three decision options, in order of preference. If three decision options are selected, then a first selection or most preferred decision option for a given decision maker may be assigned a value of 3. A second most preferred decision option may be assigned a value of 2 and the third selection or lowest preferred decision option may be assigned a value of 1. The values for each of these selected decision options may then be multiplied by that participant's weighting ($W_{Pn}$), determined similar to that described above. When all participants choices or selections are thus scored, the scores from each participant may be added for each decision option. The set of decision options may be ranked from the highest total score to lowest total score. The option with the highest total score is determined to be the group's selection. Of course, other variations of this method are possible, and some variations may apply better to certain scenarios than others.

The first, second and third most preferred options need not be expressly stated as such. The ranking of preferred options may also be inferred or determined based on the particular order that a decision maker may revise his selection of decision options in order to facilitate convergence. For example, the first decision option by a decision option may be considered the decision makers most preferred decision option. The first revised decision option selected by the decision maker may be considered as the second most preferred decision option and so forth with each subsequent revised decision option.

Figure 1B:
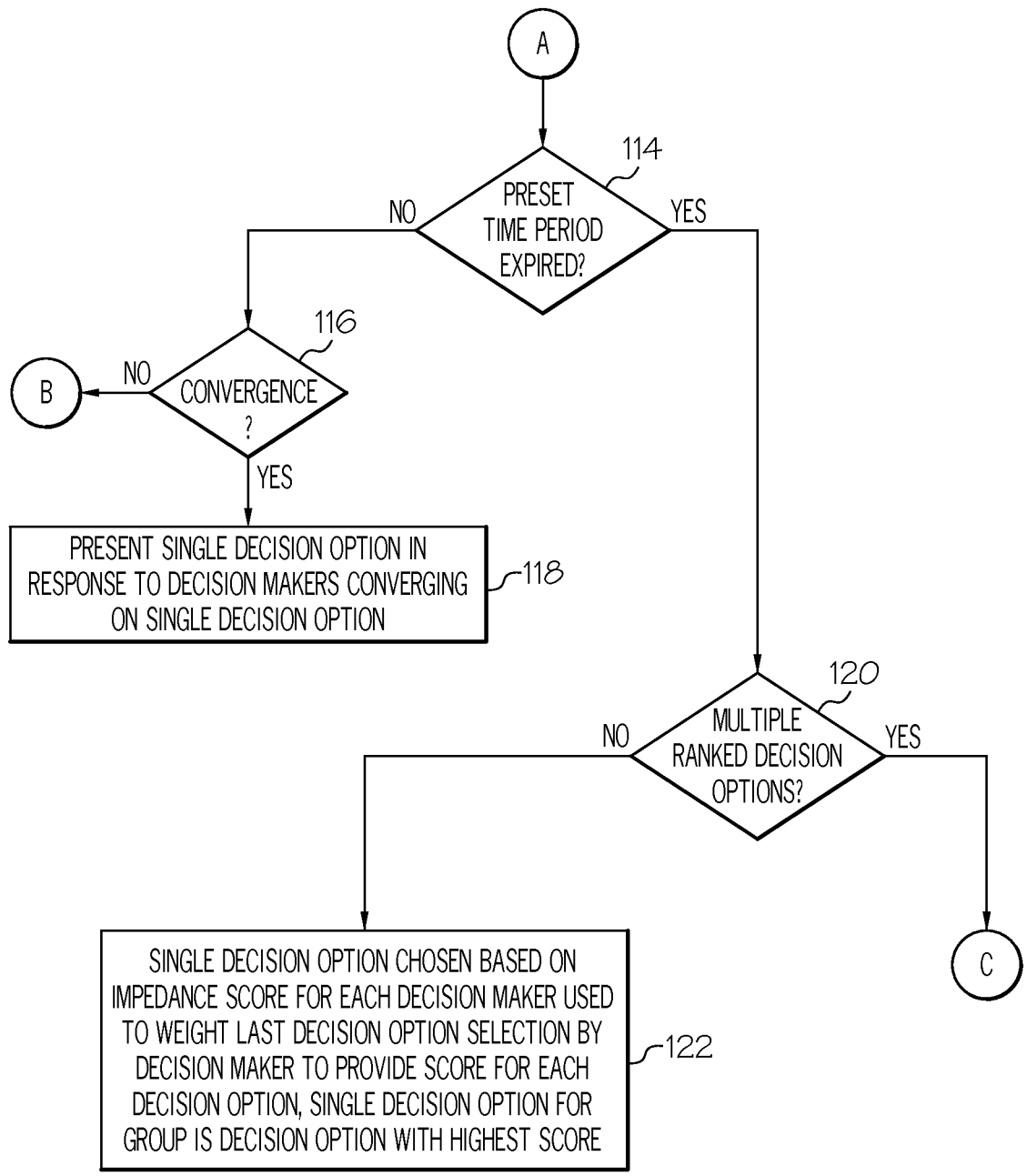
Figure 1C:
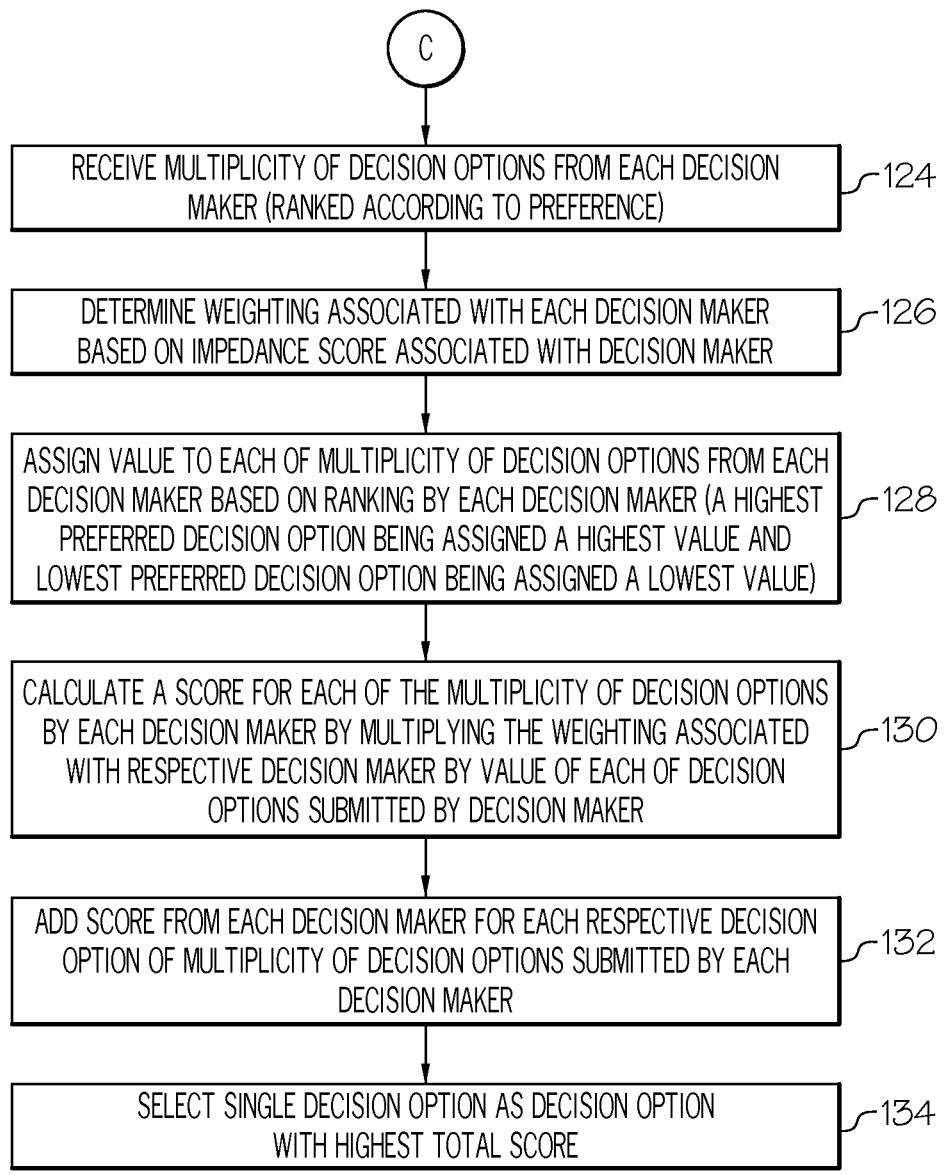

FIGS. 1A-1C (collectively FIG. 1) are a flow chart of an example of a method 100 for autonomic group decision making in accordance with an embodiment of the present invention. In block 102, a plurality of decision options may be presented to each decision maker of a group of decision makers.

In block 104, at least one decision option selected and submitted by each decision maker may be received. If the decision makers are permitted to select multiple decision options, the decision options may be ranked by the respective decision makers. For example, the decision maker may rank the selected decision options from a most preferred decision option to a lesser preferred this decision option or may use some other ranking to indicate a level of preference.

In block 106, a decision making result may be presented to each decision maker. An example of a graphical user interface for presenting the decision making results will be described with reference to FIG. 2. The decision-making results may include an indication of preference for each decision option by the group of decision makers, a number of decision makers that preferred each decision option, and impedance score for each decision maker, a feature or mechanism to revise a previously selected decision option or options and any other information that may be helpful in allowing the decision maker to revise the selection of decision options in order to converge to a single decision option for the group of decision makers. Optionally, an identification (ID) of the decision makers selecting each decision option may be presented. The impedance score of a particular participant or decision maker may be presented only to the particular participant or to all of the decision makers.

In block 108, each decision maker may be allowed to revise a previously selected decision option or selected set of decision options until convergence on the single decision option by the group of decision makers or an expiration of a preset set time period before convergence on the single decision option by the group of decision makers. A graphical user interface may be presented to each decision maker that may include a feature or mechanism for selecting a different decision option or set of decision options from that previously selected by the decision maker. The graphical user interface may also permit the decision maker to re-rank the decision options if multiple decision options may be selected by the decision maker or participant. An impedance score, as described below, of the decision maker may also be presented so that the decision maker may realize how his revised selection may impact his impedance score and convergence toward the single decision option prior to submitting the revised selection or confirmation of selection of the revised selection.

In block 110, an impedance score may be determined for each decision maker in response to at least one decision maker selecting at least one different decision option from the one previously selected. The impedance score of each decision maker may be based on a behavior or set of actions by the decision maker regarding selection of a decision option or options that moves the group decision process either toward convergence or away from convergence to the single decision option by the group of decision makers. A level of the impedance score indicates either a progression toward convergence to the single decision option or away from convergence to the single decision option by the decision maker associated with the impedance score. For example, a lower impedance score may indicate an action or actions performed by the decision maker that would result in movement toward convergence to the single decision, and a higher impedance score may indicate performance of an action or actions by the decision maker that result in moving away from convergence to the single decision option.

An example of a set of actions or behaviors by a decision maker that may lower the impedance score and represent movement toward convergence may include, but is not necessarily limited to: changing to a decision option or options selected by a greater number of decision makers; a shorter time duration between selecting a revised decision option or options compared to selecting a previous decision option or options which demonstrates a motivation by the decision maker to reach the single decision option by the group more quickly and efficiently; selecting a larger number of preferred decision options than previously selected which demonstrates more flexibility in offering more choices by the decision maker that may be selected as the single decision option by the group and therefore reaching a resolution as quickly and efficiently as possible; foregoing an option to rank preferred selections of a group of decision options thus providing more flexibility in reaching resolution sooner; modifying the decision option to accommodate the selection of other decision makers for converging on the single decision option in less than a preset time period; and any other actions or behaviors that make convergence easier or more efficient.

A revised impedance score may be dynamically determined each time one of the decision makers selects a revised decision option or a decision option or options different from the one previously selected by the decision maker. As described in more detail herein, the impedance score and revised impedance score may be determined by an impedance engine.

In block 112, the revised decision making results may be presented in response to receiving a revised decision option selection or selections from at least one decision maker. A revised decision-making result may be presented each time at least one decision maker selects a different decision option or set of decision options from that previously selected until the group of decision makers converges on the single decision option or expiration of the preset set time period without the decision makers converging on the single decision option. A revised impedance score may also be determined for affected decision makers in response to the at least one decision makers selecting the different decision option or set of decision options. An affected decision makers may be any decision maker whose impedance score has changed because of the new decision option or options selected by the at least one decision maker and received by the system.

In block 114, a determination may be made if a preset time period has expired. If the preset time period has expired, the method 100 may advance to block 116. In block 116, a determination may be made if there is convergence to the single decision option. If the group of decision makers have not converged to the single decision option, the method 100 may return to block 110 and the method 100 may continue similar to that previously described. If the group of decision makers have converged to the single decision option in block 116, the method 100 may advance to block 118. In block 118, the single decision option may be presented in response to the decision makers converging on the single decision option.

Returning to block 114, if the preset time period has expired the method 100 may advance to block 120. In block 120, a determination may be made if the decision makers have selected multiple decision options and ranked the decision options based on preferences. If the decision makers have only been allowed to select a single decision option, the method 100 may advance to block 122. In block 122, the single decision option may be selected based on the impedance score for each decision maker being used to weight the decision option selected last by the decision maker to provide a score for each decision option. The single decision option is the decision option of the plurality of decision options with the highest score.

In accordance with an embodiment, similar to that previously described, an order in which each decision maker selected new or revised decision options may also be ranked. For example, the first selected decision option may be considered the most preferred option by a decision maker and assigned a highest value. The second or first revised decision option selected may be considered the next most preferred option by the decision maker and assigned a lower value than the first selected or most preferred option and so forth for subsequently selected or revised decision options. The series of decision options or revised decision options by each decision maker may then be weighted or multiplied by a value corresponding to the impedance score of the decision maker that selected the series of decision options or revised decision options. This provides a score for each decision option. The weighting for the impedance score of each decision maker may be determined similar to that previously described or by some other mechanism. The scores for each decision option for each decision maker may then be added to provide an accumulated score for each decision option. The decision option with the highest total score may be selected as the single decision option for the group.

In block 120, if the decision makers have been permitted to select multiple decision options and rank the multiple decision options according to their respective preferences, the method 100 may advance to block 124. In block 124, the multiplicity of decision options selected by each decision maker may be received and ranked according to the respective preferences of each of the decision makers.

In block 126, a weighting associated with each decision maker may be determined based on the impedance score associated with each decision maker. The weighting may be determined similar to that previously described or some other mechanism for determining the weighting of each decision maker based on the impedance scores may be utilized.

In block 128, a value may be assigned to each of the multiplicity of decision options from each decision maker based on the preference ranking by each decision maker. For example a highest preferred decision option may be assigned a highest value and a lowest preferred decision option may be assigned a lowest value with intermediate preferences being assigned some value in a continuum between the lowest and highest values.

In block 130, a score may be calculated for each of the multiplicity of decision options from each decision maker by multiplying the weighting associated with each respective decision maker by the value of each decision option submitted or selected by the decision maker.

In block 132, the score from each decision maker for each respective decision options selected by each decision maker is added. In block 134, the single decision option is selected as the decision option with the highest total score.

Figure 2:
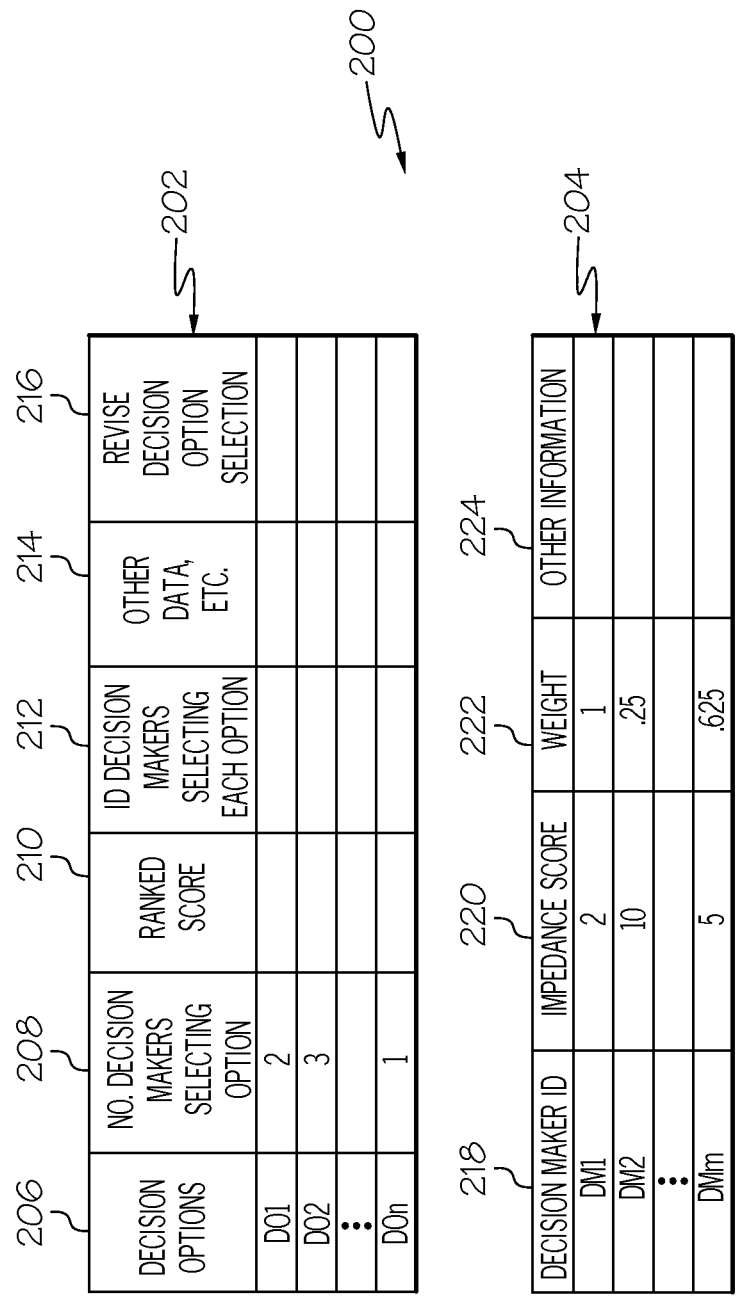
FIG. 2 is an example of a graphical user interface for presentation of decision making results in accordance with an embodiment of the present invention.

FIG. 2 is an example of a graphical user interface (GUI) 200 for presenting decision making results in accordance with an embodiment of the present invention. The GUI 200 may include one or more tables 202 and 204. While the exemplary GUI 200 presenting decision-making results is illustrated in FIG. 2 as including two tables the information may be contained or formatted in a single table or may be presented in a format other than a table or tables as illustrated in FIG. 2. The first table 202 may include a first column 206 for identifying decision options. Accordingly, each row or cell of the decision column 206 may identify a different decision option for convergence to a single decision option by the autonomic group decision making process described herein.

A second column 208 may be provided for indicating the number of decision makers that selected each decision option identified in column 206. A ranked score column 210 may be provided for providing a ranked score corresponding to each decision option when more than one decision option may be selected by each decision maker and the multiple decision options selected may be ranked, for example, from a most preferred decision option to a lesser preferred decision option similar to that previously described.

In accordance with an embodiment, a column 212 for identifying the decision makers selecting each decision option may optionally be provided. Under some circumstances, decision makers may want to remain anonymous and may not want other decision makers to know which options they selected. Under other circumstances, identifying the decision makers may more efficiently drive the decision makers to convergence on a single decision option because of group dynamics that may be associated with the selections of being know by all the decision makers.

The table 202 may also include a column 214 for other data or information that may assist the decision makers in selecting new decision options for facilitating convergence to the single decision option. The table 202 may further include a column 216 to allow the decision maker to revise his previously selected and submitted decision option by entering and submitting a new decision option.

The GUI 200 may optionally include a second table 204 for identifying information associated with each of the decision makers. Accordingly, the second table 204 may include a first column 218 for identifying each of the decision makers; a second column 220 for indicating an impedance score associated with each decision maker; a third column 222 for indicating a weight associated with each decision maker; and a column 224 for other information that may facilitate convergence to the single decision option during the decision making process. The weight in column 222 may be calculated based on the impedance score similar to that previously described. The second table 204 may be optional presented in that decision makers may not want their particular information related to the decision-making process presented to the other decision makers. In other embodiments, the information associated with a particular decision maker may only be presented to that decision maker. However, optionally presenting the selection information associated with each decision maker to all the decision makers may more efficiently drive the decision makers to convergence on the single decision option because of group dynamics.

The following is an example of a group decision making process for selecting a meeting time in accordance with an embodiment of the present invention. In this application, the system described above may be augmented by a calendar tool. The participants in the decision making process are shown the complete range of possible meeting times (based on well-established group free time search methods). This can happen in a synchronous context (e.g. an online meeting or a group chat), or asynchronous context (e.g. a team room calendar). Given the range of possible meeting times, each participant can indicate n number of preferred meeting times (n could be a system configuration), and preferences could be ranked or unranked (another system configuration). For example, each participant may indicate three preferred times, which may be ranked from most preferred to least preferred. As participants begin indicating preferences (or subsequently change preferences), all participants may see which time slots are common (picked by others), the size of commonality (the number of participants who prefer the same time slots), and the degree of commonality (the merged preference level). Participants could easily see where "blocker(s)" might exist, i.e., a single person who has no common times. Adjustments may be made by either the blocker modifying his schedule or others could modify their schedule to accommodate the blocker. Picking times best for the group, removing obstacles, etc. would all be actions which would lower the impedance score. Only indicating one time, or a time that has no availability for the rest of the group, would increase the impedance score of a participant. Each member could see how the group was doing, how their actions were helping (or not) and ultimately either reach a decision, or have the system or selection engine finalize the decision for the group.

In accordance with another example for choosing a web color palette, the system or method described above could be applied to a "media gallery" or "files" application. The participants in the decision making process are shown the color palette options and can submit new options or variations to existing options. Given the range of possible color palettes, each participant may indicate n number of palettes (n could be a system configuration), and preferences could be ranked or unranked (another system configuration). For the purposes of this example, each participant may indicate three preferred palettes, which may be ranked from most preferred to least preferred. As participants begin indicating preferences (or subsequently change preferences), all participants may see which palettes are common (picked by others), the size of commonality (the number of participants who prefer the same palette), and the degree of commonality (the merged preference level). Participants may easily see where "blocker(s)" might exist, i.e., a single person who has a strong preference for one particular palette and adjust accordingly. Either the blocker may modify their choice or others could modify theirs to converge with the blocker. Picking palettes most common to the group, removing obstacles (i.e. non-common choices), etc. would all be actions which would lower the impedance score. Only indicating one palette choice, or a palette choice that has no commonality with the rest of the group, would increase the impedance score. Each member could see how the group was doing, how their actions were helping (or not) and ultimately either reach a decision, or have the system finalize the decision for the group.

In accordance with another example for finalizing a tag line for a product, the group decision making method or system or be applied to a "survey system." The participants in the decision making process are shown the tag line options (the options may be a final list culled down from numerous previous meetings). Given the range of possible tag lines, each participant may indicate n number of tag lines (n could be a system configuration), and preferences could be ranked or unranked (another system configuration). For the purposes of this example, each participant can indicate three preferred tag lines, which may be ranked from most preferred to least preferred. As participants begin indicating preferences (or subsequently change preferences), all participants may see which tag lines are common (picked by others), the size of commonality (the number of participants who prefer the same tag line), and the degree of commonality (the merged preference level). Participants may easily see where "blocker(s)" might exist, that is, a single person who has a strong preference for one particular tag line. Adjustments may be made to reach convergence on a single tag line option. Either the blocker could modify their choice or others could modify theirs to converge with the blocker. Picking tag lines most common to the group, removing obstacles (i.e. non-common choices), etc. would all be actions which would lower the impedance score. Only indicating one tag line choice, or a tag line choice that has no commonality with the rest of the group, would increase impedance score. Each member could see how the group was doing, how their actions were helping (or not) and ultimately either reach a decision, or have the system (selection engine) finalize the decision for the group.

FIG. 3 is a block schematic diagram of an example of a system 300 for autonomic group decision making in accordance with an embodiment of the present invention. The method 100 of FIGS. 1A-1C may be embodied in and performed by the system 300. The system 300 may include a processing device 302. The processing device 302 may be a server or similar processing device. The processing device 302 may include a processor 304 for controlling operation of the processing device 302 and for performing functions, such as those described herein with respect to autonomic group decision making. The processing device 302 may also include a file system 306 or memory. An operating system 308, applications and other programs may be stored on the file system 306 for running or operating on the processor 304. A group decision making module 310 or system may also be stored on the file system 306 and may be compiled and run on the processor 304 to perform the functions for group decision making similar to that described herein. The method 100 of FIGS. 1A-1C may be embodied in the group decision making module 310 and performed by the processor 304 when the group decision making module 310 is compiled and run on the processor 304.

The group decision making module 310 may include an impedance engine 311. The impedance engine 311 may be configured to determine or calculate impedance scores similar to that described herein. For example, the impedance engine 311 may perform functions similar to that described with respect to block 110 in FIG. 1A. The impedance engine 311 may present a revised impedance score to at least the decision maker in response to the decision maker submitting a revised decision option selection. The impedance engine 311 may also present a revised impedance score to a decision maker in response to the decision maker selecting a proposed different decision option or options before the proposed decision option is actually accepted or submitted in the group decision making process. This allows the decision maker to realize the impact of his proposed new decision option and whether he might want to make a different selection.

The group decision making module 310 may also include a selection engine 312. Similar to that previously described, the selection engine 312 may be configured to perform a selection of the single decision option in response to the decision makers being unable to converge on the single decision option or in the event a preset time limit expires without the decision makers having converged on the single decision option similar to that described with reference to blocks 124-134 of FIG. 1C. The impedance engine 311 and selection engine 312 may be part of the group decision module 310 as shown in the exemplary embodiment in FIG. 3, or in another embodiment may the impedance engine 311 and selection engine 312 may each be a separate component from the group decision making module 310.

The processing device 302 may also include one or more input devices, output devices or combination input/output devices, collectively I/O devices 314 in FIG. 3. The I/O devices 314 may include, but are not necessarily limited to, a keyboard or keypad, pointing device, such as a mouse, disk drive and any other devices to permit a user to interface with and control operation of the processing device 302 and to access the group decision making module 310 or system. At least one of the I/O devices 314 may be a device to read a computer program product, such as computer program product 316. The computer program product 316 may be similar to that described in more detail herein. The group decision making module 310 may be loaded on the file system 306 from a computer program product, such as computer program product 316.

A user 322 or decision maker of the system 300 for group decision making may use a computer system 324 or communications device to access the processing device 302 or server and group decision making module 310 or system for group decision making. The computer system 324 or communications device may be any sort of communications device including a mobile or handheld computer or communications device. The computer system 324 may include a processor 326 to control operation of the computer system 324 and a file system 328, memory or similar data storage device. An operating system 330, applications 332 and other programs may be stored on the file system 328 for running or operating on the processor 326. A web or Internet browser 334 may also be stored on the file system 328 for accessing the processing device 302 or server via a network 336. The network 336 may be the Internet, an intranet or other private or proprietary network.

In accordance with an embodiment, a group decision making application 338, feature or module may also be stored on the file system 328 and operate on the processor the 326 of the user's computer system 324. The group decision making application 338 operating on the computer system 326 may interface with or operate in conjunction with the group decision making module or system 310 on the processing device 302 or server to perform the functions and operations described herein for group decision making. Accordingly, group decision making application 338 operating on the computer system 324 may perform some of the functions and operations of the method 100 and group decision making module 310 operating on the server 302 may perform other functions of the method 100.

The computer system 324 may also include a display 342, a speaker system 344, and a microphone 346 for voice communications. One or more user interfaces may be presented on the display 342 for controlling operating the group decision making application 338 and group decision making module 310 and for performing the operations and functions described herein. For example, the graphical user interface 200 described with reference to FIG. 2.

The computer system 324 may also include one or more input devices, output devices or combination input/output devices, collectively I/O devices 348. The I/O devices 348 may include a keyboard or keypad, pointing device, such as a mouse, disk drives and any other devices to permit a user, such as user 322, to interface with and control operation of the computer system 324 and to access the group decision making application 338 and group decision making system 310 on server 302. The I/O devices 348 may also include at least one device configured to read computer code from a computer program product, such as computer program product 316.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for autonomic group decision making, comprising:
   a processor;
   a group decision making module operating on the processor, the group decision making module being configured to perform a set of functions comprising:
   presenting a plurality of decision options to each decision maker of a group of decision makers;
   receiving at least one decision option selected by each decision maker from the plurality of decision options;
   presenting a decision making result to each decision maker, the decision making result comprising an indication of the preference for each of the decision options by the group of decision makers;
   allowing each decision maker to revise the at least one decision option previously selected by the decision maker for convergence to a single decision option by the group of decision makers;
   determining an impedance score for each decision maker in response to at least one decision maker selecting a different at least one decision option from one previously selected, the impedance score of each decision maker being based on at least one action of a set of actions by the decision maker regarding selecting the at least one decision option, wherein a level of the impedance score indicates either a progression toward convergence to the single decision option or away from convergence to the single decision option by the decision maker associated with the impedance score;

revising the impedance score for a particular decision maker each time the particular decision maker selects a revised at least one decision option; and presenting the single decision option in response to the decision makers converging on the single decision option; and wherein the system further comprises a selection engine, wherein the at least one decision option selected by each decision maker comprises a multiplicity of decision options selected by each decision maker, and wherein the single decision option is selected in response to expiration of a preset time period, the selection engine being configured to perform a set of functions comprising:

determining a weighting associated with each decision maker based on the impedance score of each decision maker;

assigning a value to each of the multiplicity of decision options based on a preference for a particular decision option by each decision maker, a highest preferred decision option being assigned a highest value and a lowest preferred decision option being assigned a lowest value;

calculating a score for each of the multiplicity of decision options selected by each decision maker by multiplying the weighting associated with the decision maker by the value of each of the multiplicity of decision options selected by the decision maker; and adding the scores from each decision maker for each respective decision option of the multiplicity of decision options selected by each decision maker, wherein the decision option having the highest score is selected as the single decision option.

2. The system of claim 1, wherein a lower impedance score indicates the at least one action of the set of actions by the decision maker progressing toward convergence to the single decision option and a higher impedance score indicates the at least one action of the set actions by the decision maker moving away from convergence to the single decision option, the set of actions for lowering the impedance score comprising:

changing to the at least one decision option selected by a greater number of decision makers;

a shorter time duration between selecting the revised at least one decision option than selecting a previous at least one decision option in progression toward convergence of the single decision option;

selecting a larger number of preferred decision options than previously selected;

foregoing an option to rank preferred selections of a group of decision options; and modifying the at least one decision option to accommodate the selection of other decision makers for converging on the single decision option in less than the preset time period.

3. The system of claim 2, further comprising an impedance engine for determining and revising the impedance scores.

4. The system of claim 1, wherein the decision module is further configured to perform a set of functions comprising:

presenting a revised decision making result each time at least one decision maker selects a different at least one decision option from one previously selected until the group of decision makers converge on the single decision option or expiration of the preset time period before the decision makers converge on the single decision option;

determining a revised impedance score for affected decision makers in response to the at least one decision maker selecting the different at least one decision option; and presenting the revised impedance score for each affected decision maker to at least the affected decision maker.

5. The system of claim 1, wherein a new impedance score is dynamically determined during a decision making process based on the convergence to the single decision option in response to a different at least one decision option being selected by at least one decision maker of the group of decision makers.

6. The system of claim 1, wherein the decision making module is configured to perform a further set of functions comprising:

receiving a multiplicity of decision options selected by each decision maker, wherein the multiplicity of decision options are ranked by each decision maker based on a preference for each of the multiplicity of decision options;

assigning a value to each of the multiplicity of decision options from each decision maker based on the preference for each of the multiplicity of decision options by each decision maker; and determining the single decision option based on the impedance score for each decision maker and the assigned value of each of the multiplicity of decision options of each decision maker.

7. The system of claim 6, wherein assigning the value to each of the multiplicity of decision options from each decision maker comprises assigning a highest preference value to a highest preferred decision option by each decision maker and assigning a lowest preference value to each lowest preferred decision option.

8. The system of claim 1, wherein allowing each decision maker to revise the at least one decision option selected by the decision maker for convergence to the single decision option comprises presenting a graphical user interface to each decision maker comprising:

a number of decision makers that selected each decision option;

the impedance score for at least the decision maker; and a feature for selecting a different at least one decision option from the at least one decision option previously selected by the decision maker.

9. The system of claim 1, wherein the weighting for a particular decision maker is determined by $1-(I_{dm}-I_{min}/I_{range})$, wherein $I_{dm}$ is the impedance score of the particular decision maker, $I_{min}$ is a minimum impedance score and $I_{range}$ is a range from a lowest impedance score to a highest impedance score for the group of decision makers.

10. A computer program product for autonomic group decision making, the computer program product comprising a computer readable storage medium having program instructions embodied therewith, the program instructions executable by a device to cause the device to perform a method comprising:

presenting a plurality of decision options to each decision maker of a group of decision makers;

receiving at least one decision option selected by each decision maker from the plurality of decision options;

presenting a decision making result to each decision maker, the decision making result comprising an indication of the preference for each of the decision options by the group of decision makers;

allowing each decision maker to revise the at least one decision option previously selected by the decision maker for convergence to a single decision option by the group of decision makers;

determining an impedance score for each decision maker in response to at least one decision maker selecting a different at least one decision option from one previously selected, the impedance score of each decision maker being based on at least one action of a set of actions by the decision maker regarding selecting the at least one decision option, wherein a level of the impedance score indicates either a progression toward convergence to the single decision option or away from convergence to the single decision option by the decision maker associated with the impedance score;

revising the impedance score for a particular decision maker each time the particular decision maker selects a revised at least one decision option;

presenting the single decision option in response to the decision makers converging on the single decision option; and wherein the at least one decision option selected by each decision maker comprises a multiplicity of decision options selected by each decision maker, and wherein selecting the single decision option in response to expiration of a preset time period comprises:

determining a weighting associated with each decision maker based on the impedance score of each decision maker;

assigning a value to each of the multiplicity of decision options based on a preference for a particular decision option by each decision maker, a highest preferred decision option being assigned a highest value and a lowest preferred decision option being assigned a lowest value;

calculating a score for each of the multiplicity of decision options selected by each decision maker by multiplying the weighting associated with the decision maker by the value of each of the multiplicity of decision options selected by the decision maker; and adding the scores from each decision maker for each respective decision option of the multiplicity of decision options selected by each decision maker, wherein the decision option having the highest score is selected as the single decision option.

11. The computer program product of claim 10, wherein the method further comprises:

presenting a revised decision making result each time at least one decision maker selects a different at least one decision option from one previously selected until the group of decision makers converge on the single decision option or expiration of the preset time period before the decision makers converge on the single decision option;

determining a revised impedance score for affected decision makers in response to the at least one decision maker selecting the different at least one decision option; and presenting the revised impedance score for each affected decision maker to at least the affected decision maker.

* * * * *